(12) United States Patent
Maman et al.

(10) Patent No.: US 11,453,425 B1
(45) Date of Patent: Sep. 27, 2022

(54) FOLDING FOOD SERVICE CART

(71) Applicant: SUPER NIROSTA ASHKELON LTD, Ashkelon (IL)

(72) Inventors: Yohay Maman, Kibbutz Sade Yoav (IL); Yael Maman, Bat Adar (IL)

( * ) Notice: Subject to any disclaimer, the term of this patent is extended or adjusted under 35 U.S.C. 154(b) by 0 days.

(21) Appl. No.: 17/223,051

(22) Filed: Apr. 6, 2021

(51) Int. Cl.
    *B62B 3/02* (2006.01)
    *B62B 3/00* (2006.01)

(52) U.S. Cl.
    CPC .............. *B62B 3/025* (2013.01); *B62B 3/004* (2013.01); *B62B 3/005* (2013.01)

(58) Field of Classification Search
    CPC .......... B62B 3/025; B62B 3/004; B62B 3/005
    See application file for complete search history.

(56) References Cited

U.S. PATENT DOCUMENTS

| | | | |
|---|---|---|---|
| 3,074,734 A | | 1/1963 | Munson et al. |
| 3,191,959 A | * | 6/1965 | Heimbruch ............. B62B 3/025 280/33.991 |
| 3,782,746 A | | 1/1974 | Isaacs |
| 3,920,258 A | * | 11/1975 | Lundstrom ............. B62B 3/186 280/33.996 |
| 3,977,689 A | * | 8/1976 | Rosa ....................... B62B 3/186 280/33.996 |
| 4,478,428 A | | 10/1984 | Ziliani |
| 4,678,090 A | * | 7/1987 | Ross ....................... B62B 3/025 280/33.996 |
| 5,730,452 A | | 3/1998 | Fields |
| 6,213,494 B1 | | 4/2001 | Liaw |
| 9,428,205 B2 | * | 8/2016 | Jackson ................. B62B 3/004 |
| 2016/0286955 A1 | | 10/2016 | Cohen |

FOREIGN PATENT DOCUMENTS

| | | |
|---|---|---|
| CN | 207940485 U | 10/2018 |
| KR | 20160131235 A | 11/2016 |

* cited by examiner

*Primary Examiner* — John D Walters

(57) ABSTRACT

An embodiment of a cart for food service has a folding frame and/or removable shelves. Optionally, the frame includes sidewalls pivotally attached to opposite sides of a back. An optional wheeled base may be pivotally attached to a bottom of the back. In some embodiments, removable shelves are supported by the side walls, for example, sliding between walls on parallel tracks. Optionally the number of shelve can be changed in accordance to the depth and/or number of dishes carried. The cart has stable, locked, unfolded configuration on four wheels and approximately the width of a man. The frame optionally folds into a flat shape that is supported on two wheels and/or the shelve are held to the frame, for example in a pocket. Optionally the shelves and/or walls are made of aluminum and/or the wheels and/or base are made of stainless steel.

23 Claims, 9 Drawing Sheets

FOLDING FOOD SERVICE CART

FIELD AND BACKGROUND OF THE INVENTION

The present invention, in some embodiments thereof, relates to a folding serving cart and, more particularly, but not exclusively, to an easily stored flexible cart for carrying dishes in a banquet hall.

Korean patent publication KR20160131235 appears to disclose, "a foldable transporting cart. According to one embodiment of the present invention, the present invention reduces a width of a cart to secure an available space to allow a passenger to pass a passage when the passenger passes the passage while food is distributed or products are transported in the narrow passage of an airplane or a train."

U.S. Pat. No. 5,730,452 appears to disclose, "A collapsible cart basically for serving food. A ground support assembly includes an axle with a wheel at each end and a caster cross-bar perpendicular to the axle with a caster at each end which provides great stability. Two sets of three parallel vertical bars are pivotally supported from the axle. One set is near the outer end and another set at the other end of the axle. Shelves are supported between the two sets at spaced intervals by pivots on each vertical bar such that each shelf is in a horizontal position throughout the range of rotation of the vertical bar about its pivot."

US Patent Publication no. US2016286955 appears to disclose that, "A collapsible service cart that has four legs that are configured into two scissor arrangements. The scissor arrangements are joined together by a handle, a cross bar and two axles. The cross bar and first axle extend through both the first leg and the second leg. The second axle extends through both the third leg and the fourth leg. Both axles support wheels. A first platform is provided that is pivotably connected to both the third leg and the fourth leg. The first platform has a catch that can selectively receive and engage the cross bar. A second platform is provided that is pivotably connected to the first axle. Slides are attached to the second platform with pivot joints. The slides run along the first leg and the second leg as the service cart is changed between its open configuration and collapsed configuration."

U.S. Pat. No. 3,782,746 appears to disclose, "A four-wheel cart with a narrow horizontally extending frame connecting the running gear and serving as a support for split shelves hinged to the end frame. A vertical spacer is disposed between the running gear and the horizontal frame to permit nesting of two or more carts when the shelves are in an upright position."

U.S. Pat. No. 4,917,392 apparently discloses a folding luggage dolly comprising "a handle having portions adjacent its lower end adapted to provide support for an article in a first plane and a base joined to the handle for articulation between an extended position in which portions of the base provide support for an article in a second plane disposed substantially orthogonally to the first plane and a collapsed position in which the second plane substantially coincides with the first plane. Transversely spaced-apart wheeled carriages received on the lower end of the handle portion pivot between positions in which they are extended to orient the axes of rotation of the wheels in parallel relation to the first plane and positions in which they are retracted to orient the axes of rotation of the wheels orthogonally to the first plane. A cam arrangement moves the wheeled carriages between the extended and retracted positions automatically in response to movements of the base between its extended and collapsed positions."

U.S. Pat. No. 4,478,428 apparently discloses a cart comprising, "a frame including first and second uprights which are pivoted at their top ends for mutual rotation about a substantially perpendicular axis to their longitudinal direction and support a lower deck, which is pivotally connected, at a middle portion thereof, close to the bottom end of the second upright and slidably engages, at one end thereof, with the first upright, as well as an upper deck pivotally connected at one end to the first upright, and at a middle portion thereof, to one end of a rod-like body which is pivotally connected, with its other end, to a middle portion of the second upright."

U.S. Pat. No. 4,478,428 apparently discloses that," A foldable serving cart comprises a main support member, two second support members, support boards, locating parts and wheels. The main support member has an inverted "U" shape and has transverse rods across it. The second support members each has inverted "L" shape and is pivoted to the transverse rods from a top end and propping rods under the top end. The support boards are arranged on the top end and the propping rods of the second support members respectively. The support rod each has two separate boards and is pivoted to the main support member by means of the locating parts pivoted to the main support member. The two boards of each support board can be pivoted upwards and the second support members can be pivoted inwardly of the cart in order for the cart to be folded to a not-in-used position for saving space in storage."

Additional background art includes U.S. Pat. No. 3,074,734 and Chinese Utility Model no. CN207940485.

SUMMARY OF THE INVENTION

According to an aspect of some embodiments of the invention, there is provided a folding cart for carrying dishes of food including: a rigid rear frame member; two rigid sides pivotally attached to opposite sides of the rear frame member for along a vertical axis for opening forward out from the rear frame members; two rear wheels fixedly attached to the opposite sides of a lower portion of the rear frame member; two front wheels supporting to a front portion of the cart in an open configuration and configured for folding towards the rear frame member in a folded configuration; and a plurality of removable shelves fitting configured to be support on the sides.

According to some embodiments of the invention, a height of the cart and the rigid rear frame member is between 1 to 2 m.

According to some embodiments of the invention, a width of the cart and the rigid rear frame member is between 30 to 80 cm.

According to some embodiments of the invention, a width of the rigid rear frame member is between 30 to 80 cm.

According to some embodiments of the invention, a depth of the cart and the a width of the rigid sides is between 30 to 80 cm.

According to some embodiments of the invention, the cart further includes a folding base and wherein the two front wheels are attached to the base.

According to some embodiments of the invention, the cart where the base has a front portion which pivots around a transverse axis at a lower rear portion of the cart.

According to some embodiments of the invention, the cart where the front portion is pivoted downward when the cart is unfolded and pivoted up when the cart is folded.

According to some embodiments of the invention, the cart where a front lower portion of each of the rigid sides rests on the front portion of the base when the cart is in an open configuration.

According to some embodiments of the invention, the front portion of the base is biased upward.

According to some embodiments of the invention, the cart further includes a spring performing the biasing.

According to some embodiments of the invention, the rigid rear frame member includes a sheet of Aluminum.

According to some embodiments of the invention, each of the sides includes a sheet of Aluminum.

According to some embodiments of the invention, the base is made of steel.

According to some embodiments of the invention, the base is made of steel bars.

According to some embodiments of the invention, the removable shelves slide between and are supported by the two rigid sides.

According to some embodiments of the invention, each of the removable shelves includes an aluminum plate.

According to some embodiments of the invention, the cart further includes a container for the removable shelves.

According to some embodiments of the invention, the container is accessible when the cart is open and also when the cart is folded.

According to some embodiments of the invention, the container includes a pocket on a back surface of the rear member.

According to some embodiments of the invention, the cart is configured to roll on the rear wheels when cart is folded.

According to some embodiments of the invention, a top portion of at least one of the two sides is formed into a handle around which a user may close his fingers to hold the cart.

According to some embodiments, the invention further includes a cover and wherein the cover includes holes fitting over the handle to hold a top portion of the cover to the top of the cart.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWING(S)

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

DESCRIPTION OF SPECIFIC EMBODIMENTS OF THE INVENTION

Figure 1:
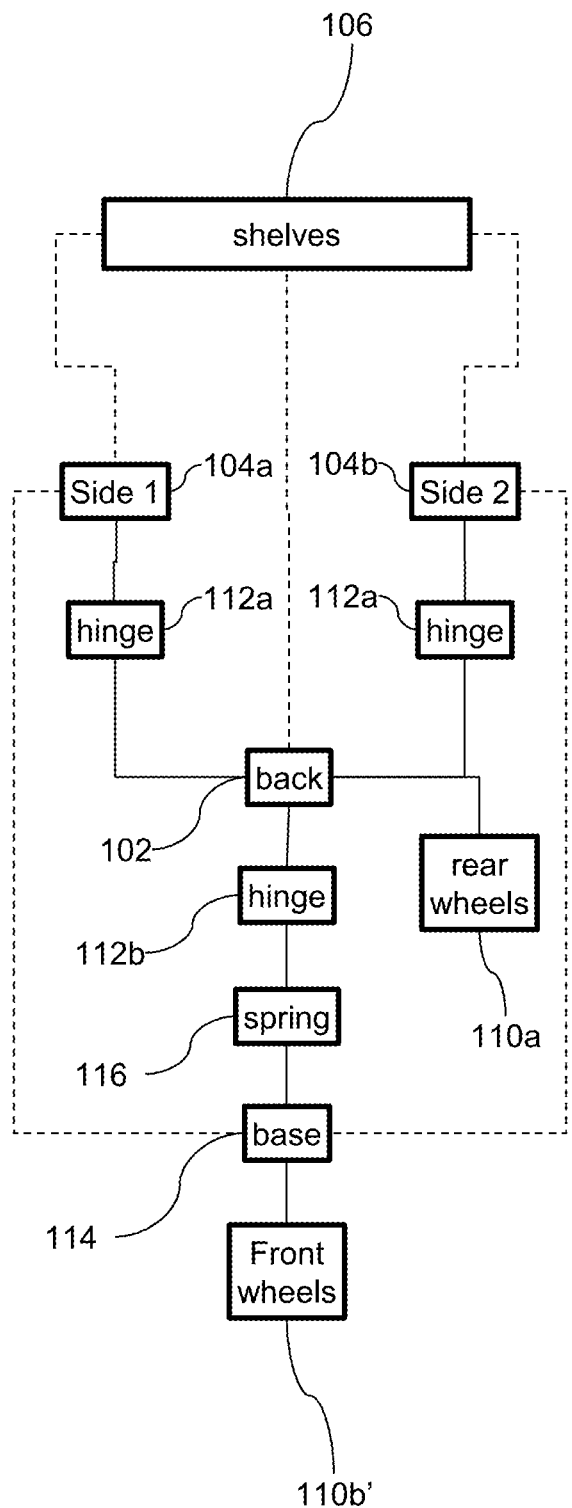
FIG. 1 is a block diagram illustration of a multi-shelf folding cart in accordance with an embodiment of the current invention.

The present invention, in some embodiments thereof, relates to a folding serving cart and, more particularly, but not exclusively, to an easily stored flexible cart for carrying dishes in a banquet hall.

Overview

An aspect of some embodiments of the current invention relates to a serving cart with flexibly positioned shelves that can be folded for easy storage. In some embodiments, the cart has a folding frame and adjustable shelves. Optionally in the open configuration the wheeled cart is between 25 to 50 cm wide and between 25 to 50 cm deep and between 75 to 150 cm tall. It may include between 5 to 20 shelves that can be moved and/or removed (for example more shelves may be used to carry a large number of flat plats and/or less shelves with more space in between for carrying tall utensils). Optionally in the closed configuration, the cart folds to a flat two wheeled configuration that is easy to transport and/or store. For example, in the folded form the height and/or width may remain about the same, but the depth may be reduced to between 10 to 40 cm and/or to between 50 to 75% and/or 25 to 50% and/or 10 to 25% and/or 2 to 10% the depth of the open cart. For example, the cart may fold up like a folding luggage dolly. For example, when open the frame may have side that include supports for the shelves. Optionally, the sides pivot to lie parallel to the back portion of the frame of the cart. Optionally, both in the open and in the folded configurations the cart can be wheeled. For example, front wheels of the cart may fold in and/or up. Optionally, rear wheels of the cart may be used for wheeling the cart over a floor in both the folded configuration.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Referring now to the drawings, FIG. 1 is a block diagram illustration of a multi-shelf folding cart in accordance with an embodiment of the current invention. In some embodiments a rear frame member 102 is pivotally attached to a pair of cart sides 104a, 104b by hinges 108. For example, a lateral edge of each side 104a, 104b may be attached to a lateral edge of the rear member 102 by a hinge 112a. Optionally, the rear member 102 and/or sides 104a, 104b may include a panel (for example an aluminum panel) and/or a metal frame (for example made of metal bars and/or telescoping bars like a folding luggage dolly handle). In some embodiments, a plurality of removable shelves 106 are optionally supported by the sides 104a, 104b and/or the rear member 102.

In some embodiments, a pair of rear wheels 110a are connected to the rear frame member. Optionally, rear wheels 110a may include casters that are fixed to the bottom of the rear member 102. Alternatively or additionally, a bar attached to the rear member may hold the wheels 110a.

In some embodiments, a pair of front wheels 110b are connected to folding base 114. Optionally, front wheels 110b may include casters. For example, the folding base may be pivotally attached to the bottom of the rear member 102. for example, the base 114 may fold vertically against the rear member, for example, like a toe plate (e.g. a base member) of a folding luggage dolly. In some embodiments, a hinge 112b attaches the base 114 to the rear member 102. Optionally, the base 114 is biased toward an upright and/or folded position by a spring 116. For example, when the cart is open, the bottom of the sides 104a, 104b may rest on the base, holding the base 114 open. For example, when the cart is open, the bottom of the sides 104a, 104b may be secured to the base 114, holding the sides 104a, 104b open. Alternatively or additionally, the shelves 106 when inserted between the sides 104a, 104b may hold the sides open.

Figure 2:
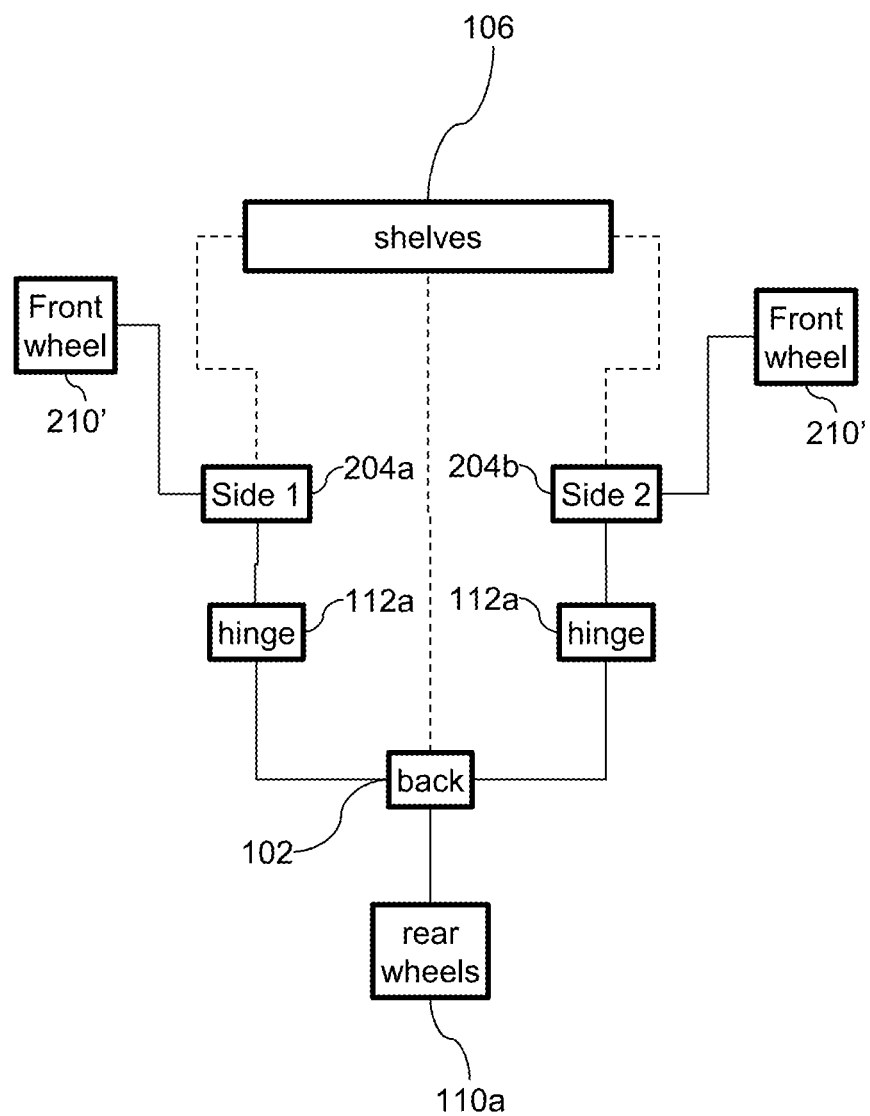
FIG. 2 is a block diagram illustration of a multi-shelf folding cart in accordance with an alternative embodiment of the current invention.

FIG. 2 is a block diagram illustration of a multi-shelf folding cart in accordance with an alternative embodiment of the current invention. For example, the front wheels 210 of the embodiment of FIG. 2 may be attached to the sides 104a, 104b, for example, near the lower front corner thereof.

Figure 3:
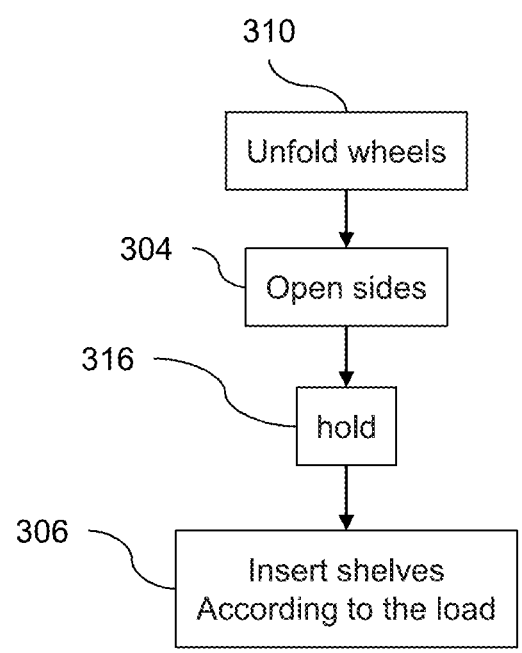
FIG. 3 is a flow chart illustration of opening a multi-shelf folding cart in accordance with an embodiment of the current invention.

FIG. 3 is a flow chart illustration of opening a multi-shelf folding cart in accordance with an embodiment of the current invention. In some embodiments, the cart is unfolded from a folded configuration to an opening configuration by first unfolding 310 the front wheels from its folded position. For example, in the folded configuration, the base may be folded up and/or held up be a spring and/or a locking mechanism. Optionally, the user releases a local lock and/or pulls down the front of the base. For example, the wheels may be lowered using downward pressure from a user and/or from gravity. Alternatively or additionally, the front wheels may be extended (for example downward and/or forward), for example on a telescoping bar. Optionally, the front wheels may include a lock that locks the wheel in the open configuration. Alternatively, the sides, when unfolded, may retain the base in the open configuration.

In some embodiments, the sides of the cart may open 304. The front wheels and/or the base may be held 316 in the extended position by the sides of the cart. For example, a base of the cart may be unfolded 310 and/or extending beyond the open position. Optionally, the sides of the cart may be opened 304 while the base is in extended beyond the open configuration. Then, the base is optionally returned from the fully extended position to the open position wherein the base contacts the bottom of the sides. Contact and/or a connector between the sides and the base may hold 316 the base down and/or prevent the base from folding up and/or hold 316 the sides from refolding inward. For example, the base may be biased upwards against the sides (for example by a spring) keeping contact between the base and the sides. Alternatively or addition, the weight of the sides, the shelves and/or their contents may push the walls down against the base holding 316 and/or keeping contact between the base and the walls. Alternatively or additionally, there may be a connector holding the base to the walls, for example a clip and/or an interference element and/or a pin.

In some embodiments, once the frame (e.g. the base and walls) is open, shelves are inserted 306. For example, a shelf may be inserted through an open front face of the cart and/or supported on both sides by the sides of the cart and/or on the back by the back member of the cart. For example, the sides may have horizontal tracks and/or support pins and/or protrusions on which the shelves are supported. Optionally the number and spacing of the shelves may be adjusted according to the load that is being delivered. For example, when delivering shallow plates of food, a larger number of shelves may be placed in the cart spaced closely together to hold a large number of the shallow plates. For example, when deeper bowls are being transported, fewer shelves may be inserted allowing more space in between for the taller bowls. For example, when taller cups are being transported, more space may be left in between shelves for the taller cups. Optionally, shelves may be arranged variably. For example, some shelves may be positioned close together and other further apart (for example one shelf may hold cups and/or have a large space above it before the next shelf. The next few shelfs may hold plates and/or be positioned close together.

Figure 4:
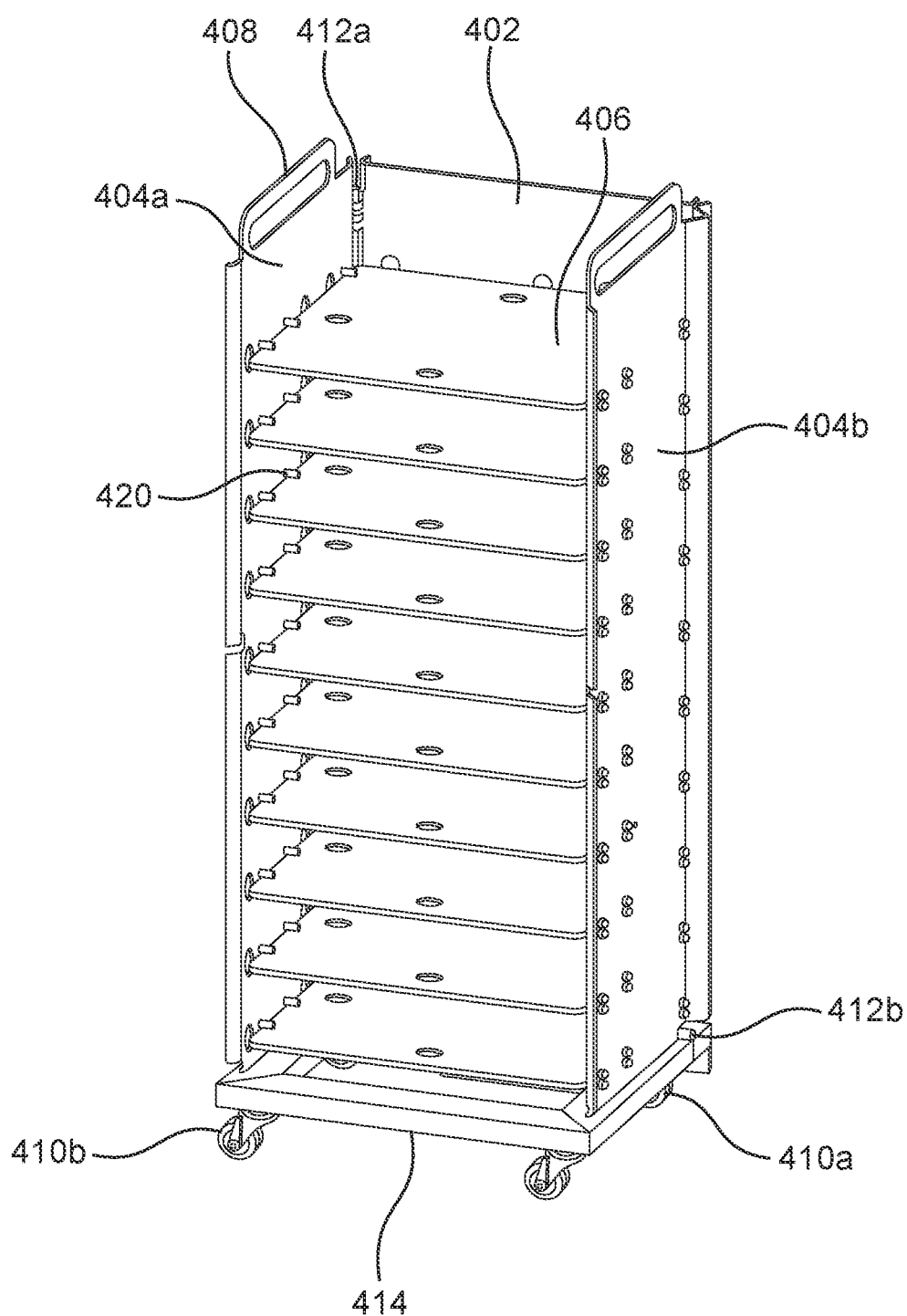
FIG. 4 is a perspective front illustration of an open multi-shelf folding cart in accordance with an embodiment of the current invention.

FIG. 4 is a perspective front illustration of an open multi-shelf folding cart in accordance with an embodiment of the current invention. In some embodiments, a cart may include a rear member 402. For example, rear member 402 may include a plate (for example made of aluminum). Alternatively or additionally, the rear member 402 may have openings and/or may be an open frame (for example plates may be inserted and/or removed from the back like the front).

In some embodiments, each lateral edge of the rear member is pivotally attached (e.g. by hinges 412a) to a side 404a, 404b of the cart. For example, each side 404a, 404b may be in the form of plate (for example made of Aluminum). Alternatively or additionally, the side 404a, 404b may have openings and/or may be an open frame. Optionally, the top of one or both sides 404a, 404b of the cart includes a handle 408.

In some embodiments, a plurality of removable shelves 406 are inserted horizontally and supported by supports 420. For example, supports 420 project inward from an inner face of side 404a, 404b into the cart. Optionally supports 420 may also project from back member 402. Optionally, the shelves 406 are also designed to hold the sides 404b, 404a of the cart open. Optionally a user may place the maximum number of shelves in the cart (for example for carrying a large number of short objects (for example flat plates). Optionally, some shelves 406 may be left out leaving more space between the remaining shelves for larger objects. Optionally when sides 404a and 404b are open they are parallel to each other on opposite sides of the cart. For example, each side may be directed perpendicular to rear member 402.

In some embodiments, in the open configuration, the cart stands on four casters 410a, 410b, for example to easily maneuver and/or roll over the floor of a banquet hall. Optionally, rear casters 410a may be fixedly attached to lower part of the rear member 402. For example, a fixed member 438 (e.g. which may be a bar, e.g. see FIG. 13) may be attached to a bottom portion of the rear member 402 and/or the castor 410a may be swivelingly attached to the bar. Optionally, a pair of front casters 410b may be attached to a folding base 414. For example, base 414 may fold up to rear member 402 by swiveling around a hinge 412b attached to a lower portion of the rear member 402 (e.g. and/or member 438). Alternatively or additionally, front wheels of a cart may be attached to a lower portion of sides 404a, 404b.

In some embodiments, when shelves are inserted between sides 404a, 404b the walls are prevented from folding together. In some embodiment, when a cart is open (e.g. sides 404a, 404b are open) a lower front portion of sides 404a, 404b rests on a front portion of base 414. The sides 404a, 404b and/or base 414 optionally bear the weight of shelves 406 and/or their contents. For example, this may prevent base 414 from folding upward while the shelves are in place. Alternatively or additionally, a connector may connect between the sides 404a, 404b and/or the base 414 preventing them from disconnecting and/or folding. Alternatively or additionally, a portion of the weight of the sides 104a, 104b, shelves 106 may be supported on the rear member 102 and/or on the rear wheels.

In some embodiments, the height of a cart may range between 50 cm to 1 meter and/or between 1 m to 1.5 m and/or between 1.5 m to 2 m. The width (e.g. between sides 404a, 404b) may range for example between 10 to 25 cm and/or between 25 to 45 cm and/or between 45 to 80 cm. The depth (e.g. from the front of shelves 406 to the rear member 402) may range between 10 to 25 cm and/or between 25 to 45 cm and/or between 45 to 80 cm. Optionally the distance between adjacent shelves may range between 2 to 4 cm and/or between 4 to 10 cm and/or between 10 to 15 cm. Larger spacing between shelves may be created by leaving out a shelf. Optionally, when in use, the shelves 406 are parallel and/or the shelves are horizontal. Alternatively or additionally, the shelves may be tilted slightly (for example tilted back to prevent plates from sliding out the front opening of the cart). The shelves may be flat. Alternatively or additionally, the shelves may include a lip and/or an indentation for example, to stabilize objects and/or prevent objects from sliding off the shelf.

Figures 5A, 5B:
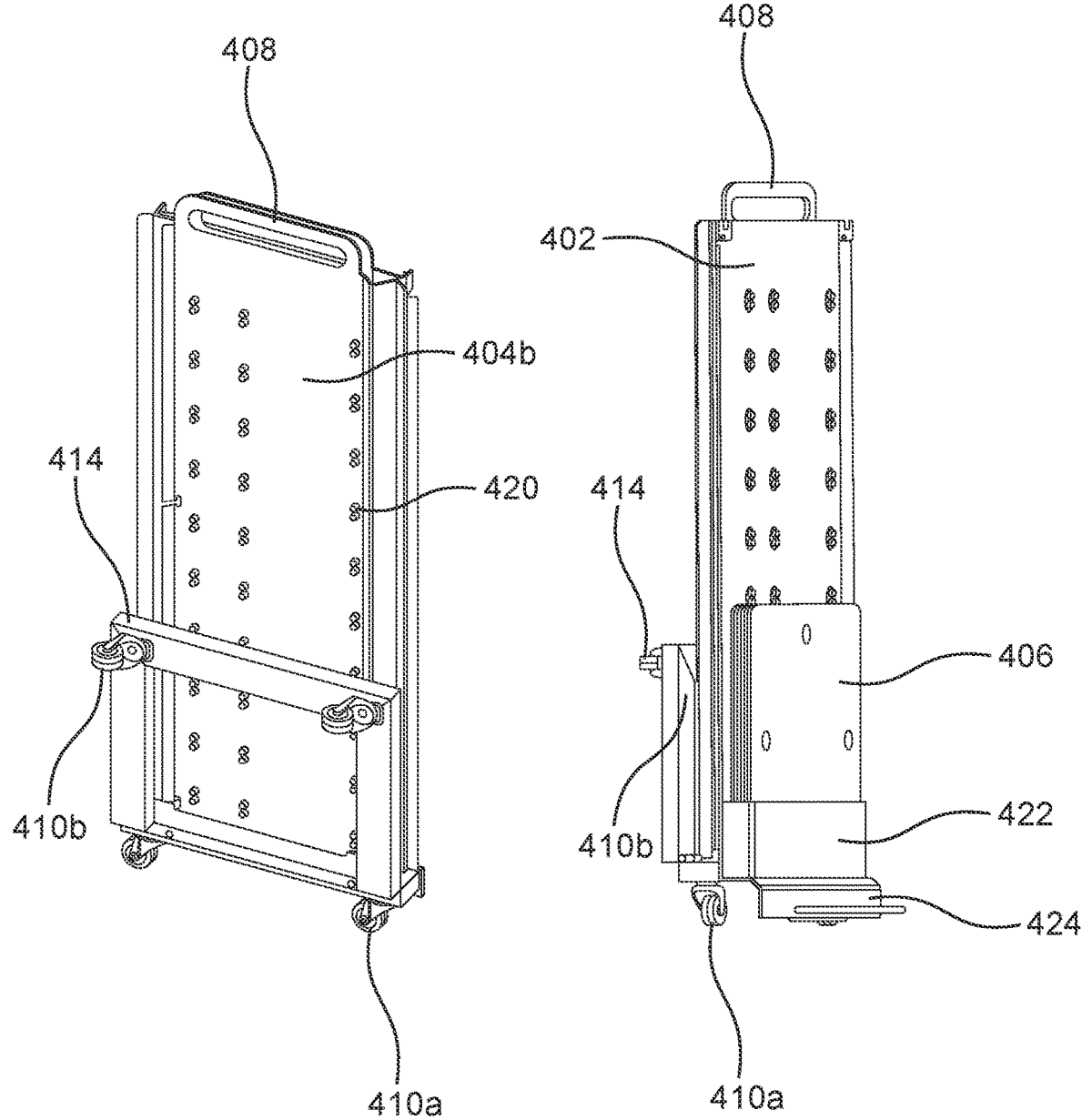
FIG. 5A is a perspective front illustration of a folded multi-shelf folding cart in accordance with an embodiment of the current invention.
FIG. 5B is a perspective rear illustration of a folded multi-shelf folding cart in accordance with an embodiment of the current invention.

FIG. 5A is a perspective front illustration of a folded multi-shelf folding cart in accordance with an embodiment of the current invention. Optionally a cart in an open configuration (e.g. as illustrated in FIG. 4) is folded by folding sides 404a, 404b flat against (e.g. approximately parallel to) back member 402. For example, this may be done by first freeing the side 404a, 404b to fold for example by removing the shelves 406 and/or extending the front of base 414 away from the bottom of sides 404a, 404b (e.g. by holding base 414 flat and/or inclining rear member 402 and/or sides 404a, 404b backwards around hinge 412a). Optionally, the front of base 414 is folded upward (e.g. pivoting around hinge 412b) to stand flat against rear member 402 and/or the folded sides 404a, 404b. Optionally in the folded configuration the cart can be wheeled, for example on its two rear wheels 410a which optionally remain on the ground.

FIG. 5B is a perspective rear illustration of a folded multi-shelf folding cart in accordance with an embodiment of the current invention. In some embodiments, a storage compartment 422 is supplied for the shelves 406. For example, the compartment 422 may be used to hold shelves that are not currently in use in the open configuration and/or the entire set of shelves may be stored in the compartment 422. Optionally, compartment 422 may project from the back of the rear member 402 of the cart. Optionally a stabilizer foot 424 is supplied to standing up the cart in the folded configuration.

In some embodiments, in the folded configuration the cart has a width and height similar to its open configuration, but the depth of the car is reduced. Optionally the depth of the folded cart from the front wheel to the back member in the folded configuration may range between 5 to 15 cm and/or between 15 to 30 cm. Optionally the depth of the folded cart from the front wheel to the foot in the folded configuration may range between 15 to 25 cm and/or between 25 to 40 cm.

Figure 6:
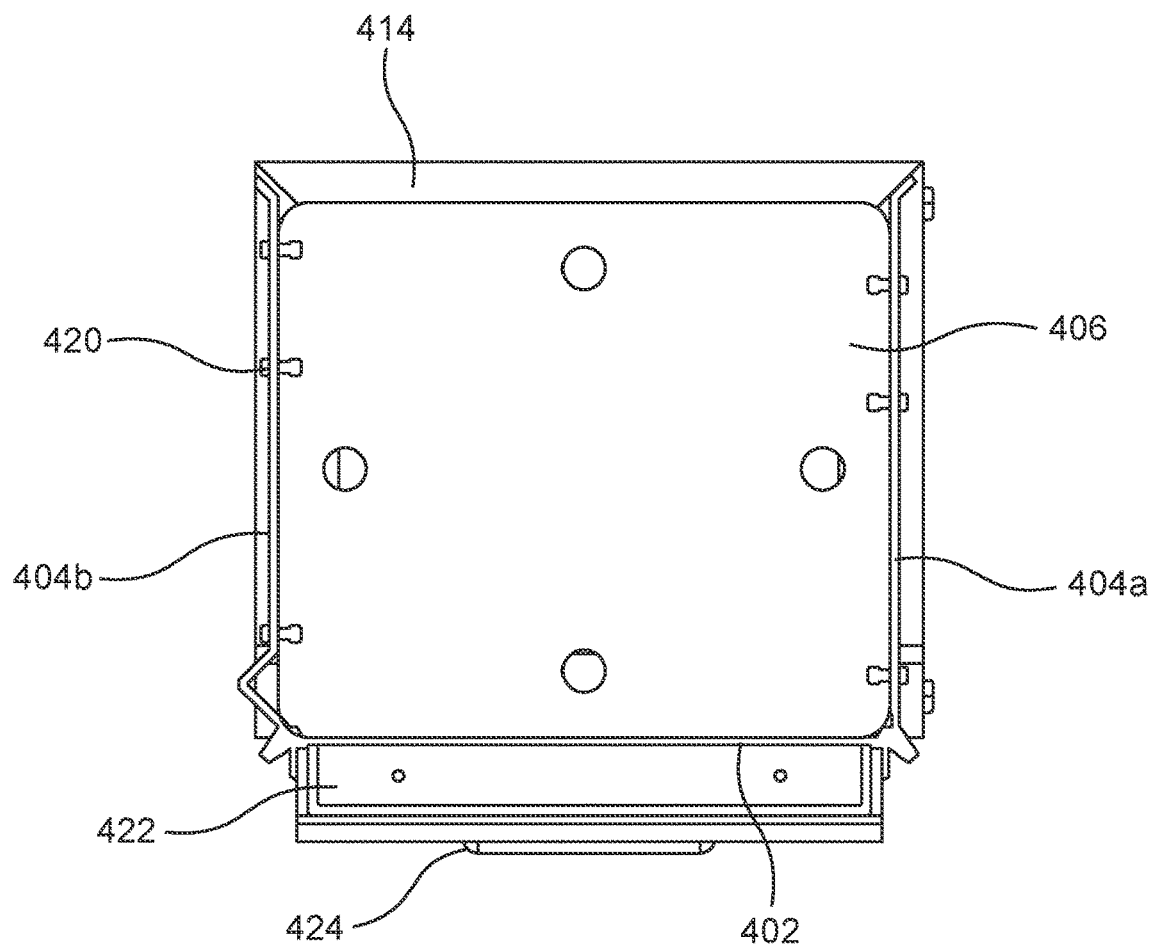
FIG. 6 is an overhead view of an open multi-shelf folding cart in accordance with an embodiment of the current invention.

FIG. 6 is an overhead view of an open multi-shelf folding cart in accordance with an embodiment of the current invention. In some embodiments, in an open configuration sides 404a and 404b project forward perpendicular to rear member 402 and/or form a parallel frame for supporting shelves 406. In some embodiments, the rear compartment 422 is available in the open configuration. For example, for storing unused shelves.

Figure 7:
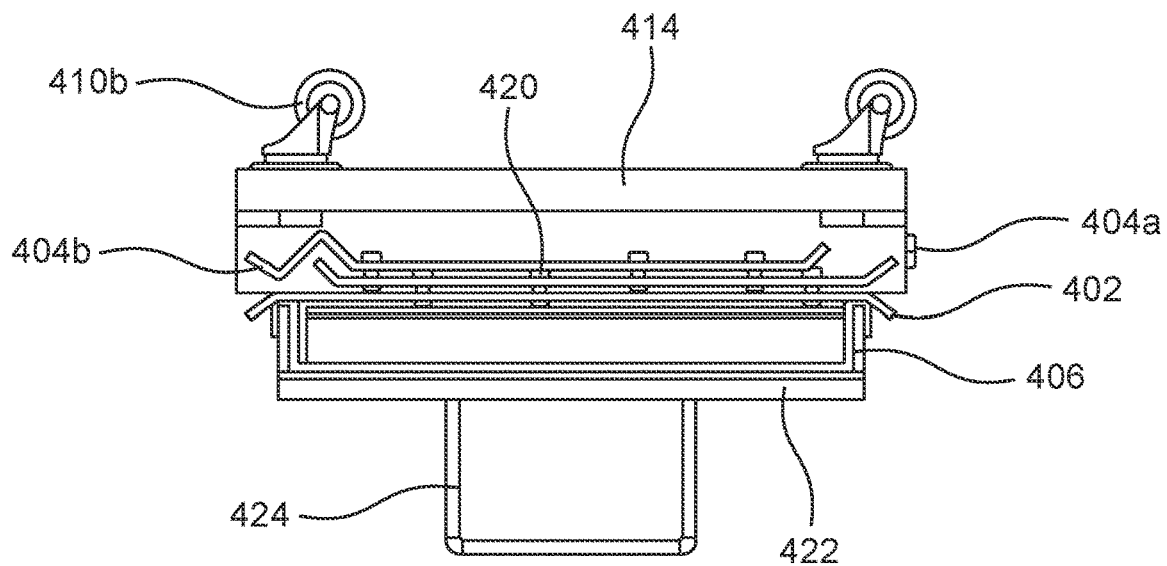
FIG. 7 is an overhead view of a folded multi-shelf folding cart in accordance with an embodiment of the current invention.

FIG. 7 is an overhead view of a folded multi-shelf folding cart in accordance with an embodiment of the current invention. Optionally sides 404a, 404b fold inward against and/or in front of and/or parallel to rear member 402. Optionally, base 414 folds up in front of rear member 402 and/or sides 404a, 404b. Optionally the base lies against and/or is parallel to rear member 402 and/or sides 404a, 404b in the folded configuration. For example, front wheels 410b may project forward from the bottom surface of the now vertical base 414. Optionally the rear edge of side 404b is creased, for example, bends in the edge allow side 404b to fold parallel to side 404a when the two sides are folded inward. In FIG. 7, shelves 406 are shown inserted and/or stacked into storage compartment 422. For example, all of the shelves 406 of the cart can be stacked into the compartment 422 for convenient storages and/or transport while the cart is folded.

Figures 8, 9:
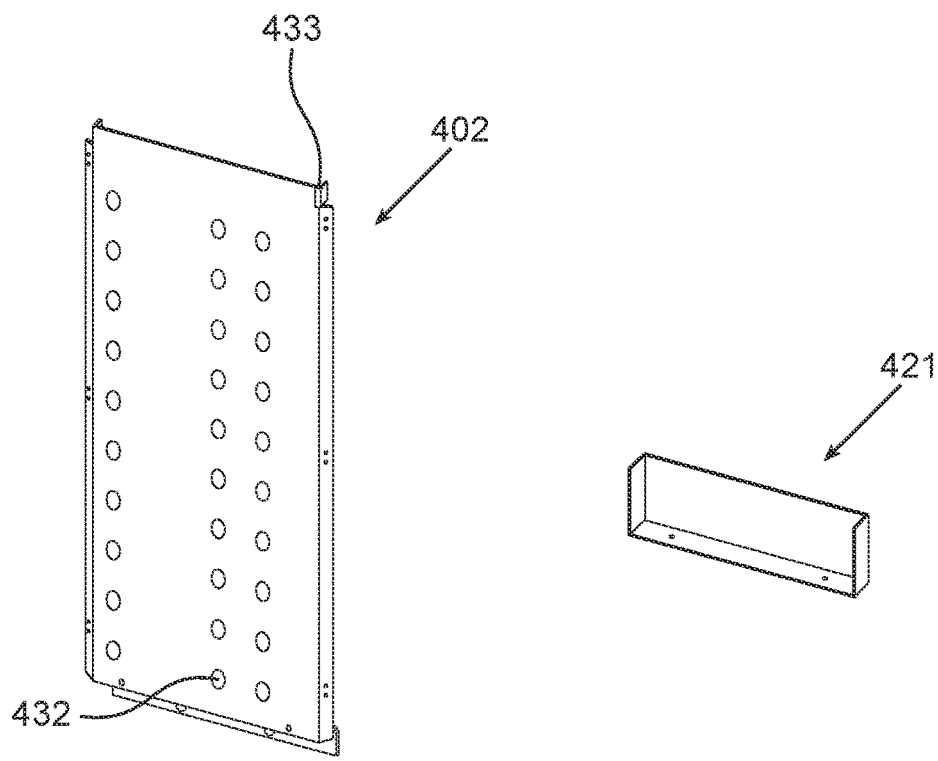
FIG. 8 is a perspective view of a rear frame member of a multi-shelf folding cart in accordance with an embodiment of the current invention.
FIG. 9 is a perspective view of a shelf storage pocket of a multi-shelf folding cart in accordance with an embodiment of the current invention.

FIG. 8 is a perspective view of a rear frame member 402 of a multi-shelf folding cart in accordance with an embodiment of the current invention. Rear member 402 optionally is made of a flat sheet of Aluminum with bent edges configured to connect to base 414 and/or sides 404a, 404b. Alternatively or additionally, rear member may be corrugated and/or include strengthening ribs and/or be made of plastic and/or steel. The thickness of the Aluminum may range between 1 to 2 mm and/or between 2 to 4 mm and/or between 4 to 8 mm.

In some embodiments, rear member 402 includes openings 432. Openings may facilitate making the member 402 lighter. Optionally the openings 432 allow airflow in between the shelves. Optionally, opening 432 may be large enough to pass a dish therethrough (for example allowing a person to load and/or remove items from a shelf through the back of the cart). In some embodiments, a height of the rear member may range between 30 to 60 cm and/or between 60 to 120 cm and/or between 120 to 200 cm. In some embodiments a width of the rear member may range between 25 to 32 cm and/or between 32 to 50 cm and/or between 50 to 75 cm. In some embodiments the rear member 402 may not have a handle. Alternatively or additionally, the rear member 402 may include a handle. For example, the rear member may have a handle on top similar to handle 408 of side members 404a, 404b. Optionally the handle adds an extra 3 to 8 cm to the height of the rear member. In some embodiments, a rear member 402 includes hooks 433 for holding a cover of the cart.

FIG. 9 is a perspective view of a shelf storage pocket of a multi-shelf folding cart in accordance with an embodiment of the current invention. Storage pocket 421 optionally is made of a flat sheet of Aluminum with bent edges folded to form a storage compartment (e.g. an open topped hollow space) when attached to a surface. For example, pocket 421 is attached to the rear surface of rear member 402 to form storage compartment 422. Alternatively or additionally, pocket 421 may be corrugated and/or include strengthening ribs and/or be made of plastic and/or steel. The thickness of the Aluminum may range between 0.5 to 2 mm and/or between 2 to 4 mm and/or between 4 to 8 mm.

In some embodiments, pocket 421 may be unbroken. Alternatively or additionally, the material of pocket 421 may include holes. Holes may facilitate making the pocket 421 lighter. Optionally the holes may make it easier to clean the storage compartment and/or the insert or remove items. In some embodiments, a height of the pocket 421 may range between 2 to 5 cm and/or between 5 to 15 cm and/or between 51 to 30 cm. For example, the height of the pocket 421 is selected large enough that a shelf inserted therein will not fall out and/or short enough that it will be easy to grab a shelf inserted therein to pull it out. For example, the height of the pocket may be approximately half (e.g. between 30% to 50% and/or between 50% to 75%) of the width of a shelf and the width of the pocket equal to or slightly larger than the length of a shelf. For example, the height of the pocket may be approximately half (e.g. between 30% to 50% and/or between 50% to 75%) of the length of a shelf and the width of the pocket equal to or slightly larger than the width of a shelf. In some embodiments a depth of the storage compartment (the width of the folded portions on the edges of the pocket 421) may range between 0.5 to 2.5 cm and/or between 2.5 to 5 cm and/or between 5 to 15 cm. For example, the depth of the storage compartment may be just slightly (between 1 to 5% and/or between 5 to 20% and/or between 20 to 50%) more than the combined thickness of all of the shelves of the cart. For example, for a cart pictured in FIG. 4 with 10 shelves (optionally the cart could be used with fewer but there may not be supports for more) if each shelf has a thickness of 3 mm then the depth of the compartment may be approximately 30 to 40 mm.

Figures 10, 11:
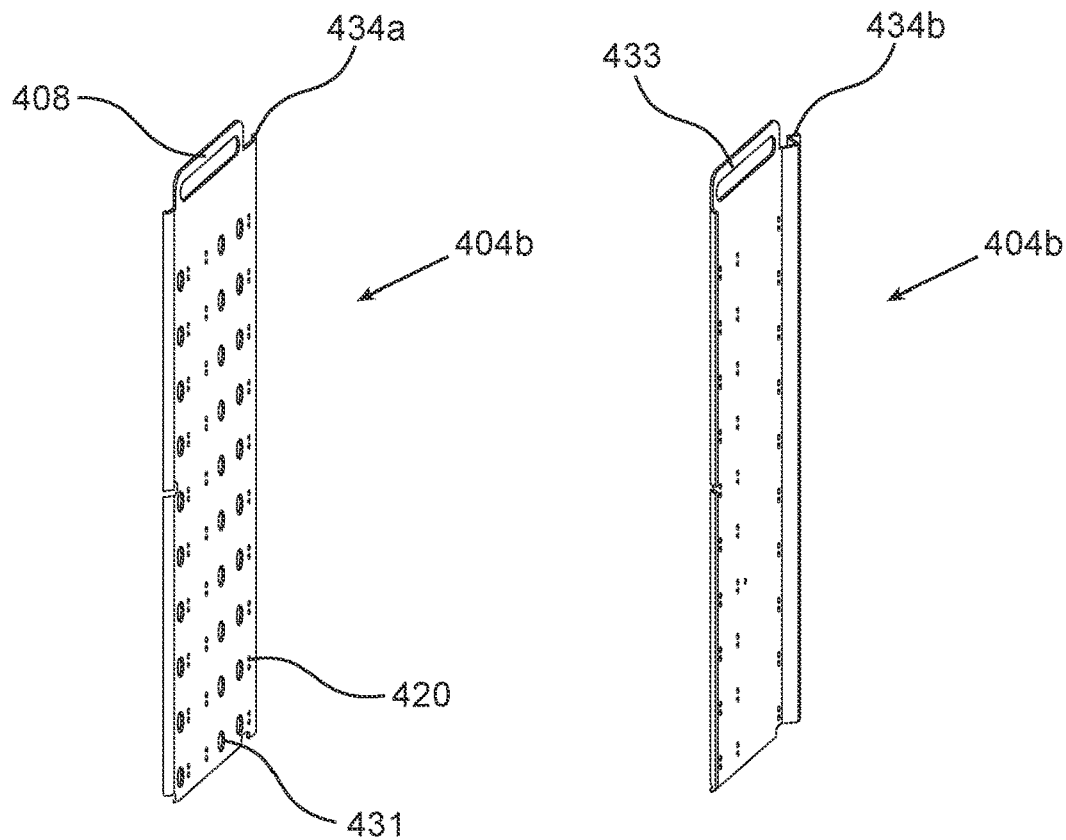
FIG. 10 is a perspective view of a right wall of a multi-shelf folding cart in accordance with an embodiment of the current invention.
FIG. 11 is a perspective view of a left wall of a multi-shelf folding cart in accordance with an embodiment of the current invention.

FIGS. 10 and 11 are a perspective views of a right side 404a and a left side 404b of a multi-shelf folding cart in accordance with an embodiment of the current invention. Sides 404a, 404b optionally are made of a flat sheet of Aluminum with bent edges configured to connect to base 414 and/or rear member 402. Alternatively or additionally, sides may be corrugated and/or include strengthening ribs and/or be made of plastic and/or steel. The thickness of the Aluminum may range between 1 to 2 mm and/or between 2 to 4 mm and/or between 4 to 8 mm.

In some embodiments, sides 404a, 404b include openings 432. Openings may facilitate making the member 402 lighter. Optionally the openings 431 allow air in between the shelves. Optionally, opening 431 may be large enough to pass a dish therethrough (for example allowing a person to load and/or remove items from a shelf through the side of the cart). In some embodiments, a height of the side 404a, 404b may range between 35 to 65 cm and/or between 65 to 125 cm and/or between 125 to 205 cm. In some embodiments a width of the side 404a, 404b may range between 20 to 30 cm and/or between 30 to 50 cm and/or between 50 to 75 cm. In some embodiments the side 404a, 404b may have a handle 408. Alternatively or additionally, the side 404a, 404b may not include a handle. For example, side without a handle on top may be slightly shorter e.g. by 3 to 8 cm. In some embodiments, a side includes a hook for holding a cover of the cart.

In some embodiments, a side 404a, 404b includes supports 420 for shelves 406. For example, supports may include a bend in the side 404a, 404b and/or a projection for supporting the shelf 406. Alternatively, a groove may be formed into the side 404a, 404b and/or the shelf 406 may slide in the groove. Alternatively or additionally, the side 404a, 404b may include a hole and/or a hook and/or a peg may fit to the hole and/or support the shelf 406.

Figure 12:
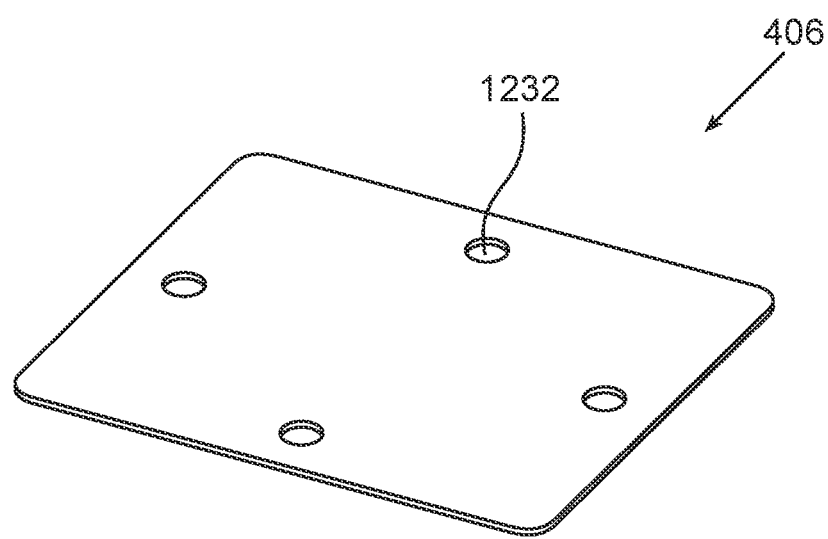
FIG. 12 is a perspective view of a shelf of a multi-shelf folding cart in accordance with an embodiment of the current invention.

FIG. 12 is a perspective view of a shelf of a multi-shelf folding cart in accordance with an embodiment of the current invention. Shelf 406 optionally is made of a flat sheet of Aluminum configured to slide between sides 404a, 404b of the open cart. For example, the width of the shelf 406 is about the distance between sides 404a, 404b in the open configuration (e.g. as illustrated in FIG. 4) and/or the length of shelf 406 is approximately the distance from the front of the cart to the inside rear wall 402. Alternatively or additionally, a shelf may be corrugated and/or include strengthening ribs and/or be made of plastic and/or steel. The thickness of the Aluminum may range between 1 to 2 mm and/or between 2 to 4 mm and/or between 4 to 8 mm.

In some embodiments, shelf 406 includes openings 1232. Openings may facilitate making the member 402 lighter. Optionally the openings 1232 make it easier to grasp the shelf (for example it pulls it out of the cart e.g. when folding the cart and/or to lower the shelf 406 into storage compartment 422 and/or to pull the shelf 406 out of storage compartment 422). Optionally, opening 1232 may be large enough to stabilize a dish placed on the shelve 406 (for example a hole and/or indentation may be shaped and sized such that the base of a plate and/or cup sits in the indentation and/or is stabilized therein). In some embodiments, a length of a shelf may range between 5 to 20 cm and/or 20 to 50 cm and/or 50 to 120 cm. In some embodiments, a width of a shelf may range between 5 to 20 cm and/or 20 to 50 cm and/or 50 to 120 cm. In some embodiments the shelf 406 may not have a handle. Alternatively or additionally, the shelf may include a handle. For example, the handle may make it easier to pull the shelf out of the cart and/or may help orient the shelf properly when inserting the shelf. Optionally the holes 1232 may be distributed differently of the front, back and/or sides of the shelf making it easier to orient the shelf when inserting it into the cart. Optionally the handle adds an extra 1 to 6 cm to the length of the shelf In some embodiments, a shelf includes hooks for example for holding a cover of the cart and/or for hanging items therefrom.

Figure 13:
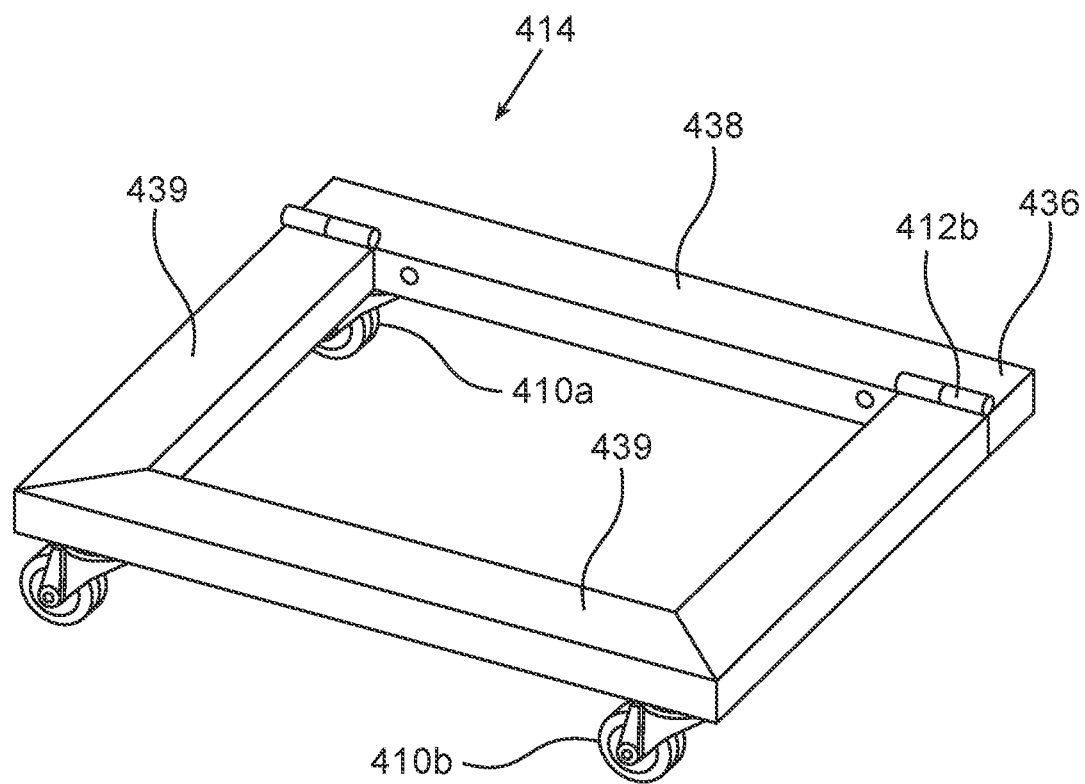
FIG. 13 is a perspective view of a wheeled base of a multi-shelf folding cart in accordance with an embodiment of the current invention.

FIG. 13 is a perspective view of a wheeled base of a multi-shelf folding cart in accordance with an embodiment of the current invention. In some embodiments a fixed member 438 of a base 414 includes a bar configured for attachment to a lower portion of the rear member 402 of the cart. Optionally, rear caster 410a are rotatably attached to the bottom of the fixed member 438. In some embodiments, a folding portion 439 of the base 414 includes the front wheels 410b of cart. For example, the folding portion 439 may fold up nearly flat (e.g. at an angle of between 0 to 5 degrees and/or between 5 to 30 degrees) with the rear member 402 of the cart. For example, folding portion 439 pivots around a transverse axis (e.g. around hinges 412b) near the bottom rear of the cart. Alternatively or additionally, the front part of the folding portion may retract rearward when the cart is folded (e.g. on telescopic rods) and/or may be removable.

Figure 14:
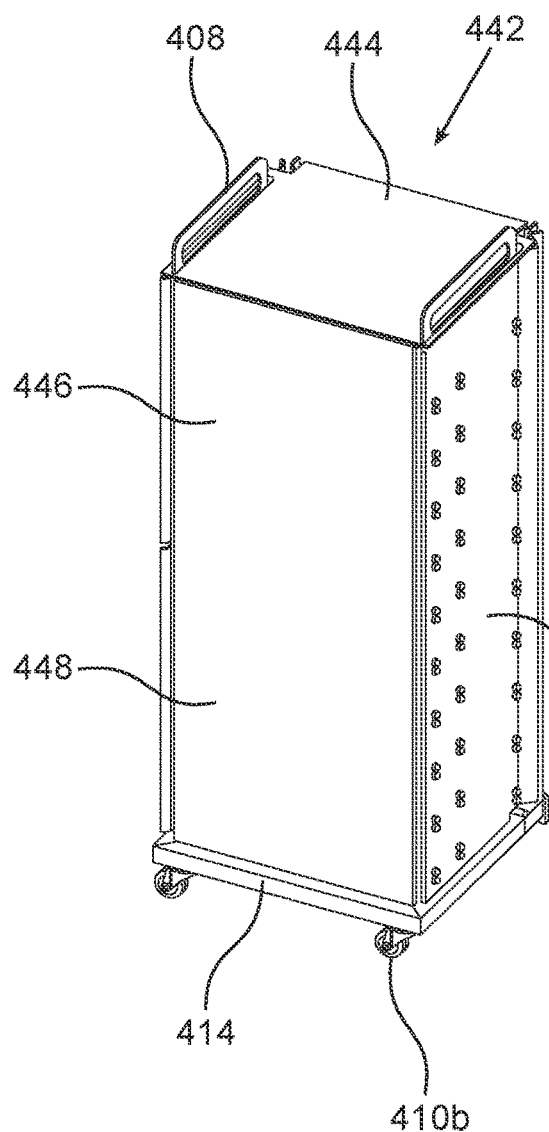
FIG. 14 is a perspective front view of a multi-shelf folding cart and cover in accordance with an embodiment of the current invention.

In some embodiments base 414 comprises a steel frame. For example, the width of the base 414 is slightly larger than the distance between sides 404a, 404b in the open configuration (e.g. as illustrated in FIG. 4) and/or the length of base 414 is slightly more than the distance from the front of the cart to the inside rear wall 402. Alternatively or additionally, the base may be made of corrugated material and/or include strengthening ribs and/or be made of plastic and/or steel. The cross-sectional width and/or height of the bars in base 414 may range between 1 to 2 cm and/or between 2 to 5 cm and/or between 5 to 15 cm. Alternatively or additionally, a base may be corrugated and/or include strengthening ribs and/or be made of plastic and/or Aluminum FIG. 14 is a perspective front view of a multi-shelf folding cart and cover in accordance with an embodiment of the current invention. In some embodiments a cart includes a cover 442. Optionally, cover 442 covers the front and/or top of the cart. For example, the cover may prevent objects from falling off the cart and/or preserve the temperature of items on a cart and/or protect the items from external attack (e.g. by animals [cats, mice, insects]). Optionally the cover is made of a soft and/or easy to clean material (e.g. vinyl). For example, the cover may have a top section 444 and/or one or more front sections 446, 448.

Figure 15:
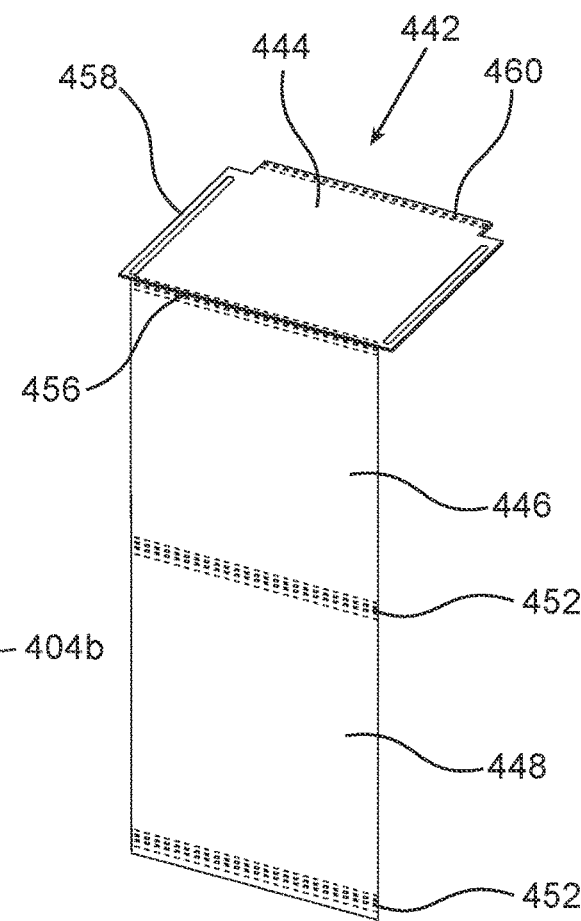
FIG. 15 is a perspective front view of a multi-shelf folding cart cover in accordance with an embodiment of the current invention.

FIG. 15 is a perspective front view of a multi-shelf folding cart cover in accordance with an embodiment of the current invention. In some embodiments, a hinge 452, 456 may connect between sections of the cover 442. Optionally, near the bottom of the lower section 448 there is a weight and/or a connector 452. For example, the weight and/or a connector 452 connecting to a lower portion of the cart may hold the bottom of the cover down covering the lower front section of the cart. Alternatively or additionally, the bottom section of the cover may be folded up (e.g. pivoting around hinge 452 and/or folding) for example to uncover a lower portion of the cart while an upper portion remains covered. When the lower section 448 is folded up, it may be held up by connecting connector 452 to a higher portion of the cart.

Alternatively or additionally, both lower section 448 and top section 446 of the cover may be folded up uncovering the entire front of the cart.

In some embodiments, a top portion of the cover may attach (reversibly and/or permanently) to the top of the cart. For example, holes 458 in the cover may fit over handles 408 on the cart and/or a connector 460 may connect to a mating connector (e.g. a hook) on the cart.

It is expected that during the life of a patent maturing from this application many relevant materials and/or technologies (e.g. types of wheels, hinges, supports, connectors) will be developed and the scope of the terms are intended to include all such new technologies a priori.

As used herein the term "about" refers to ±10%

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween. When multiple ranges are listed for a single variable, a combination of the ranges is also included (for example the ranges from 1 to 2 and/or from 2 to 4 also includes the combined range from 1 to 4).

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A folding cart for carrying dishes of food comprising:
a rigid rear frame member;
two rigid sides pivotally attached to opposite sides of said rear frame member for along a vertical axis for opening forward out from said rear frame members;
two rear wheels fixedly attached to said opposite sides of a lower portion of said rear frame member;
two front wheels supporting to a front portion of said cart in an open configuration and configured for folding towards said rear frame member in a folded configuration;
a folding base and wherein said two front wheels are attached to a front portion of the base and wherein said front portion of the base is biased upward; and
a plurality of removable shelves configured to be supported on said sides.

2. The cart of claim 1, wherein a height of the cart and said rigid rear frame member is between 1 to 2 m.

3. The cart of claim 2, wherein a width of the cart and said rigid rear frame member is between 30 to 80 cm.

4. The cart of claim 3, wherein a width of said rigid rear frame member is between 30 to 80 cm.

5. The cart of claim 4, wherein a depth of the cart and said a width of said rigid sides is between 30 to 80 cm.

6. The cart of claim 1, wherein said rigid rear frame member includes a sheet of Aluminum.

7. The cart of claim 1, wherein each of said sides includes a sheet of Aluminum.

8. The cart of claim 1, wherein said removable shelves slide between and are supported by said two rigid sides.

9. The cart of claim 1, wherein each of said removable shelves comprises an aluminum plate.

10. The cart of claim 1, wherein said cart is configured to roll on said rear wheels when cart is folded.

11. The cart of claim 1, wherein a top portion of at least one of said two sides is formed into a handle around which a user may close his fingers to hold the cart.

12. A folding cart for carrying dishes of food comprising:
a rigid rear frame member;
two rigid sides pivotally attached to opposite sides of said rear frame member for along a vertical axis for opening forward out from said rear frame members;
two rear wheels fixedly attached to said opposite sides of a lower portion of said rear frame member;
two front wheels supporting to a front portion of said cart in an open configuration and configured for folding towards said rear frame member in a folded configuration; and
a plurality of removable shelves configured to be support on said sides;
further comprising a container for said removable shelves.

13. The cart of claim 12, further comprising a folding base and wherein said two front wheels are attached to a front portion of the base.

14. The cart of claim 13, where said base has a front portion which pivots around a transverse axis at a lower rear portion of the cart.

15. The cart of claim 14, where said front portion is pivoted downward when the cart is unfolded and pivoted up when the cart is folded.

16. The cart of claim 15, where a front lower portion of each of the rigid sides rests on said front portion of the base when the cart is in an open configuration.

17. The cart of claim 13, wherein said front portion of the base is biased upward.

18. The cart of claim 17, further comprising a spring performing said biasing.

19. The cart of claim 13, wherein said base is made of steel.

20. The cart of claim 13, wherein said base is made of steel bars.

21. The cart of claim 12, wherein said container is accessible when the cart is open and also when the cart is folded.

22. The cart of claim 21, wherein said container includes a pocket on a back surface of said rear member.

23. A folding cart for carrying dishes of food comprising:
a rigid rear frame member;
two rigid sides pivotally attached to opposite sides of said rear frame member for along a vertical axis for opening forward out from said rear frame members;
two rear wheels fixedly attached to said opposite sides of a lower portion of said rear frame member;
two front wheels supporting to a front portion of said cart in an open configuration and configured for folding towards said rear frame member in a folded configuration; and
a plurality of removable shelves configured to be support on said sides;
wherein a top portion of at least one of said two sides is formed into a handle around which a user may close his fingers to bold the cart; and
further including a cover and wherein said cover includes holes fitting over said handle to hold a top portion of the cover to the top of the cart.

* * * * *